US007526651B2

(12) United States Patent
Arditti Modiano et al.

(10) Patent No.: US 7,526,651 B2
(45) Date of Patent: Apr. 28, 2009

(54) ELECTRONIC GROUP SIGNATURE METHOD WITH REVOCABLE ANONYMITY, EQUIPMENT AND PROGRAMS FOR IMPLEMENTING THE METHOD

(75) Inventors: David Arditti Modiano, Clamart (FR); Laurent Frisch, Paris (FR); Dimitri Mouton, Paris (FR)

(73) Assignee: France Telecom, Paris (FR)

( * ) Notice: Subject to any disclaimer, the term of this patent is extended or adjusted under 35 U.S.C. 154(b) by 984 days.

(21) Appl. No.: 10/848,943

(22) Filed: May 19, 2004

(65) Prior Publication Data
US 2004/0260926 A1    Dec. 23, 2004

(30) Foreign Application Priority Data
May 20, 2003    (FR) .................................. 03 06035

(51) Int. Cl.
*H04L 9/00* (2006.01)
(52) U.S. Cl. ...................................................... 713/180
(58) Field of Classification Search ................. 713/170, 713/176, 180
See application file for complete search history.

(56) References Cited

U.S. PATENT DOCUMENTS

2005/0022102 A1* 1/2005 Gentry ........................ 715/500

OTHER PUBLICATIONS

Adams et al., "Internet X.509 Public Key Infrastructure Time-Stamp Protocol (TSP)", Network Working Group, Request for Comments: 3161, pp. 1-26 (Aug. 2001).

Ateniese et al., "A Practical and Provably Secure Coalition-Resistant Group Signature Scheme", in L. Bellare, editor, Advances in Cryptology—CRYPTO 2000, vol. 1880 of LNCS, pp. 255-270, Springer-Verlag (2000).

Bresson et al., "Threshold Ring Signatures and Applications to Ad-hoc Groups", in M. Yung, editor, Advances in Cryptology—CRYPTO 2002, $22^{nd}$ Annual International Cryptology Conference (Santa Barbara, USA) Proceedings, LNCS 2442, pp. 465-480, Springer-Verlag (Aug. 22, 2002).

Chaum et al., "Group Signatures", Proc. of EuroCrypt 1991, vol. 547 of LNCS, pp. 257-265, Springer-Verlag (1991).

Housley et al., "Internet X.509 Public Key Infrastructure Certificate and Certificate Revocation List (CRL) Profile," Network Working Group, Request for Comments: 3280 (Apr. 2002).

Rivest et al., "How to Leak a Secret", retrieved from website: http://theory.lcs.mit.edu/{rivers/RivestShamirTauman-HowToLeakASecret.pdf, pp. 1-13 (Jun. 4, 2001).

* cited by examiner

*Primary Examiner*—Gilberto Barron, Jr.
*Assistant Examiner*—Samson B Lemma
(74) *Attorney, Agent, or Firm*—Drinker Biddle & Reath LLP

(57) ABSTRACT

A ring-signature scheme is adapted so that at least one of the variability parameter values used is an identity trace of the anonymous signatory, determined as a function of anonymity withdrawal data stored and held secret by an anonymity withdrawal entity in connection with an identification of the anonymous signatory. This provides a subsequent controlled capacity of withdrawing the anonymity of the signatory, either by an authority, or by the signatory himself.

28 Claims, 8 Drawing Sheets

ELECTRONIC GROUP SIGNATURE METHOD WITH REVOCABLE ANONYMITY, EQUIPMENT AND PROGRAMS FOR IMPLEMENTING THE METHOD

BACKGROUND OF THE INVENTION

The present invention relates to electronic signature techniques and more particularly to group signature techniques.

The fundamental object enabling the public part of a cryptographic key (public key) to be trusted is the certificate. The certificate standard used in numerous networks, including the Internet, is X.509, version 3. A specification thereof is provided by the PKIX working group of the IETF ("Internet Engineering Task Force") in the Request For Comments (RFC) 3280, "Internet X.509 Public Key Infrastructure; Certificate and Certificate Revocation List (CRL) Profile" published in April 2002. The certificate is an object comprising in particular:

the public key to be certified;
the identity of its possessor;
a period of validity;
a cryptographic signature of these data by the private key of a Certifying Authority (CA) that issued the certificate.

Trusting the public key associated with an identity amounts to making sure of the validity of the certificate. For PKIX, a certificate is valid at a given instant T (in terms of trust):

either if it is explicitly declared as "trusted certificate". In practice, the certificates of users are never declared trusted. Rather, a reduced number of trusted certificates is declared, consisting of the certificates of certain CAs;
or if it satisfies the following conditions:
the cryptographic signature of the certificate is mathematically valid;
the instant T forms part of the period of validity of the certificate;
the certificate is not revoked at the instant T;
the public key of the issuing CA is available through a certificate of the CA, and this certificate of the CA is itself valid at the instant T.

The electronic signature function makes it possible to guarantee the authenticity of a document, i.e. to dependably authenticate its signatory or signatories and to guarantee that the document has not been modified (integrity). The electronic signature is often used to guarantee nonrepudiation. The nonrepudiation of a document consists in guarding against a subsequent denial from its author.

This traditional electronic signature transposes the mechanism of manual signing over to the electronic world. Another form of electronic signature, relying on multiplayer cryptography techniques, offers features which both comparable to regular signing (some guarantee of the origin of a message) and radically different (anonymity of the signatory among a group of people). The group signature allows an individual member of a group administered by an authority to effect a signature in the name of the group.

The group signature involves at least one signatory, a group of individuals to which the signatory belongs, and an authority. It allows an individual to sign in the name of a group of individuals, but anonymously. When an entity verifies a group signature, it is certain that the signature has indeed been effected by a member of the group, without being able to determine which one only one entity can determine the identity of the signatory: the authority. In this case, it is said to "open" the signature. The group signature is then said to have "limited anonymity". This possibility of withdrawing the anonymity may turn out to be useful, in particular in case of fraud or to ensure the proper operation of a service such as for example an auction service. In general, the group signature requires an initialization phase and involves specific cryptographic keys.

The group signature mechanisms are not standardized. Examples thereof are described in the articles:

D. Chaum, et al., "Group signatures", Eurocrypt'91. 1991;
G. Atienese, et al., "A Practical and Provably Secure Coalition-Resistant Group Signature Scheme", Crypto 2000, http://www.zurich.ibm.com/se curity/publications/2000/CAJT2000.pdf.

These known group signature techniques generally make it possible to withdraw anonymity. However, they have drawbacks: they are unwieldy to set up, require an administrating authority, and their keys are incompatible with the market standards. The management of the groups greatly complicates these group signature mechanisms. In general, it is the authority that is charged with this. However, this does not detract from the complexity of the operations for enrolling a new member into an already existing group and of removing a member from a group. As the signing operations call upon nonstandard keys, a user furnished with an RSA key and with an X.509 certificate will not be able to use this key to effect his group signature.

The "ring-signature" is a multiplayer cryptography signature algorithm which is not properly speaking a group signature. It differs from the group signature in that:

the people in whose names the signatory produces his ring-signature are not part of a formalized group and have not therefore given explicit consent;
there is no authority;
unless the signatory is explicitly mentioned, anonymity cannot be withdrawn.

However, it is necessary that all possible signatories should have a public key accessible to the signatory. There is no need for a prior phase of configuration. As there is no authority, the ring-signature offers complete anonymity, i.e. nobody can determine who is the actual signatory, unless complementary mechanisms are introduced.

This ring-signature mechanism was first introduced by R. L. Rivest, et al.: "How to Leak a Secret", Asiacrypt'01, December 2001, http://theory.lcs.mit.edu/-rivest/RivestSh amirTauman-HowToLeakASecret.pdf). Variants thereof have since been proposed, for example by E. Bresson, et al, "Threshold Ring Signatures and Applications to Ad-hoc Groups" Crypto'02, August 2002.

The ring-signature involves a signatory $E_s$ from among a set E of r entities or individuals $E_i$ able to sign (i ranging from 1 to r), furnished with respective public keys $PUB_i$ accessible to the signatory. Each of the public keys $PUB_i$ is associated, in an asymmetric cryptography scheme such as for example the RSA, with a private key $PR_i$ known only to the member $E_i$. The signatory $E_s$ belongs to the set E ($1 \leq s \leq r$). A ring-signature algorithm allows $E_s$ to sign in the name of E but anonymously in the sense that an entity verifying a ring-signature is certain that the signature was indeed effected by a member of E, without being able to determine which one.

Let M denote the set of messages or documents able to be signed. The number b designating a "ring width" expressed in bits, B denotes the set of messages of b bits. A "combination" C determines a combination function $C_{m,v}$ as a function of any number of input variables in B, taking its values in B, dependent on at least two parameters $m \in M$ and $v \in B$ and such that, all the input variables except any one being fixed, $C_{m,v}$ is a bijection of B into B. To minimize the algorithmic complexity, it is advisable that (i) for all values of the input variables, $C_{m,v}$ be easy to calculate, and (ii) the inverse of each of the aforesaid bijections be also easy to calculate. This inverse operation is called "solving of the ring equation". For certain variables $y_1, y_2, \ldots, y_r$, "the ring equation" is expressed in the following manner:

$$C_{m,v}(y_1, y_2, \ldots y_r) = v \quad (1)$$

Moreover we define a function A which, with asymmetric cryptography keys (PUB, PR), where PUB is a public key and PR a corresponding private key, associates a pair (g, h) such that:

g is a function with values in B which can depend on PUB but not on PR;

h is a function of a variable of B which can depend on PUB and PR;

g and h are inverses of one another, i.e.:
    g(h(y))=y for any y in B; and
    h(g(x))=x for any x acceptable as an input of g.

The definition of the triplet (b, C, A) characterizes a ring-signature scheme. A "ring-signature production system" is defined by such a triplet (b, C, A), a set of entities $E = \{E_i / 1 \leq i \leq r\}$ each having a pair of public and private keys $PUB_i$, $PR_i$ defining a pair of functions $(g_i, h_i) = A(PUB_i, PR_i)$, an index $s \in \{1, 2, \ldots r\}$ designating a signatory entity $E_s$, and a message $m \in M$.

This ring-signature production system being fixed, the provision of the public keys $PUB_i$ of the r entities $E_i$, of an element v of B, and of r elements $x_i$ ($1 \leq i \leq r$) is called the ring-signature of the message m in the name of E. This signature is valid if it satisfies the ring equation (1) for the r input variables $y_i = g_i(x_i)$ of B ($1 \leq i \leq r$).

An algorithm for ring-signature production by S thus executes as follows:

/a/ randomly choose v in B;

/b/ choose random elements $x_i$ for all the $i \neq s$;

/c/ solve the ring equation in $y_s$ by fixing the input variables $y_i = g_i(x_i)$ for $i \neq s$ by means of the public keys $PUB_i$, i.e. determine $y_s$ such that $$C_{m,v}(g_1(x_1), \ldots, g_{s-1}(x_{s-1}), y_s, g_{s+1}(x_{s+1}), \ldots, g_r(x_r)) = v$$

/d/ calculate $X_s = h_s(y_s)$ by means of the private key $PR_s$; and

/e/ deliver the ring-signature: $(PUB_1, PUB_2, \ldots, PUB_r; v; x_1, x_2, \ldots, x_r)$.

This ring-signature is then verifiable by the following verification algorithm:

/f/ calculate the $y_i = g_i(x_i)$ for $1 \leq i \leq r$ by means of the public keys $PUB_i$;

/g/ evaluate the combination function $C_{m,v}(y_1, y_2, \ldots, y_r)$; and

/h/ accept the ring-signature if and only if the result is v.

The ring-signature makes it possible to remedy the drawbacks of the conventional group signature procedures. However, in its known versions, it precludes the ability to withdraw anonymity. Now, the ability to withdraw anonymity is an essential property for a certain number of applications such as for example electronic suggestion boxes, electronic lottery applications, electronic auction services, etc.

An object of the present invention is to adapt the ring-signature technique to allow the withdrawal of anonymity.

SUMMARY OF THE INVENTION

The invention thus proposes a method of electronic signing a message (m) by an anonymous signatory belonging to a group of r possible signatories each having an associated public key and an associated private key in an asymmetric cryptography scheme, r being an integer greater than 1. This method comprises the following steps executed in an electronic signing device of the anonymous signatory:

obtaining at least r values of variability parameters including the values of r-1 variability parameters respectively associated with the other possible signatories of the group and at least one additional parameter value;

enciphering the values of the r-1 variability parameters associated with the other possible signatories of the group, by means of the respective public keys of said other possible signatories, thereby producing r-1 enciphered values respectively associated with the other possible signatories of the group;

determining a complementary value which satisfies a ring equation whose variables are the message to be signed, each of the r-1 enciphered values associated with the other possible signatories of the group, each additional parameter value and said complementary value;

deciphering the complementary value determined, by means of the private key of the anonymous signatory, thereby producing the value of a variability parameter associated with the anonymous signatory; and delivering an electronic signature of the message comprising the respective public keys of the r possible signatories of the group, the values of the variability parameters respectively associated with the r possible signatories of the group and each additional parameter value.

According to the invention, at least one of the r values of variability parameters is an identity trace of the anonymous signatory, determined as a function of anonymity withdrawal data stored and kept secret by at least one anonymity withdrawal entity in relation with an identification of the anonymous signatory.

The method allows the withdrawal of anonymity regarding signatures having the same properties as the ring-signature. This advantageously makes it possible to employ a signature algorithm having most of the properties of group signatures, but with standard keys, without the unwieldy management of groups, and without the compulsory requirement for an administrator.

Another aspect of the present invention pertains to a electronic signature device for signing messages by an anonymous signatory, comprising means adapted for implementing the steps of the method defined above, which are incumbent on such electronic signature device.

Another aspect of the present invention pertains to a trusted server for intervening in the production of anonymity withdrawal data relating to at least one anonymous signatory, comprising means for implementing the steps of certain modes of execution of the method defined above, which are incumbent on such server.

The invention also proposes computer programs to be installed in an electronic signature device or in a trusted server. These programs comprise instructions for implementing the steps of a method as defined above, which are incumbent on such device or server, during their execution by processing means of said device or server.

Yet another aspect of the present invention pertains to a method for withdrawing anonymity of the anonymous signatory of a message signed electronically in accordance with a method as defined above. This anonymity withdrawal method comprises the steps of:

verifying the electronic signature of the message, by extracting from the electronic signature of the message the respective public keys of the r possible signatories of the group, the values of the variability parameters respectively associated with the r possible signatories of the group and each additional parameter value, by obtaining r enciphered values by enciphering the values of the variability parameters associated with the r possible signatories of the group by means of their respective public keys, and by making sure that the message, the r enciphered values and each additional value together satisfy the ring equation;

recovering the anonymity withdrawal data stored by the anonymity withdrawal entity in relation with the identification of the anonymous signatory;

recalculating the identity trace of the anonymous signatory as a function of the anonymity withdrawal data recovered; and verifying that the recalculated identity trace corresponds to the identity trace included in the r values of variability parameters forming part of the electronic signature of the message.

The invention also proposes a computer device for withdrawing anonymity of at least one anonymous signatory of an electronically signed message, comprising means adapted for implementing the steps of the anonymity withdrawal method above, as well as a computer program to be installed in such a computer device for withdrawing anonymity of at least one anonymous signatory of an electronically signed message, comprising instructions for implementing the steps of the anonymity withdrawal method above during execution of the program by processing means of said device.

DESCRIPTION OF PREFERRED EMBODIMENTS

Figure 1:
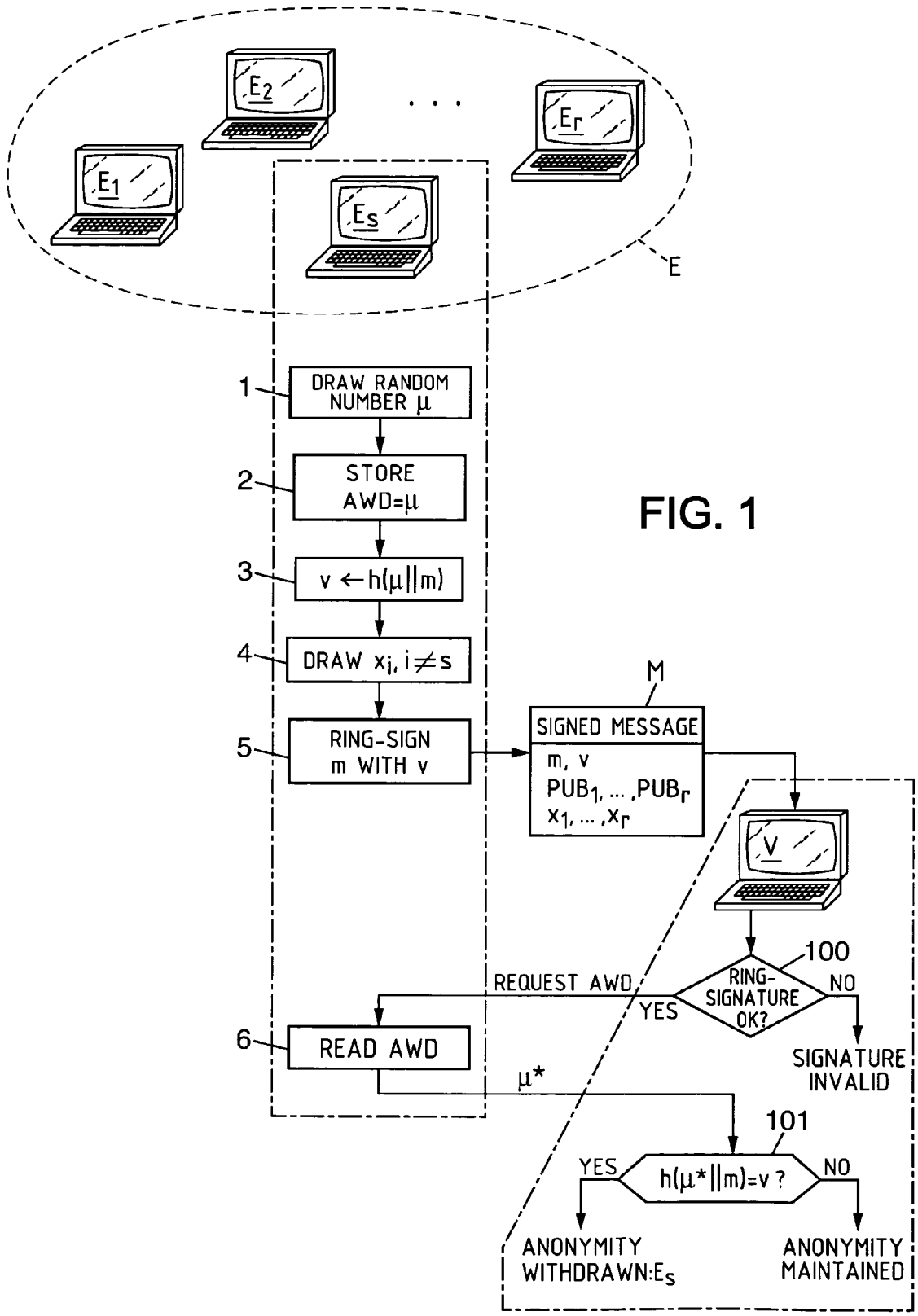
FIGS. 1 to 8 are flow charts illustrating various embodiments of methods according to the invention.

The invention is illustrated here, nonlimitingly, within the framework of a ring-signature technique as described in the aforesaid publication by R. Rivest, et al.

Each entity $E_i (1 \leq i \leq r)$ of the set E is furnished with a public key $PUB_i$ of RSA type, of modulus $n_i$ and exponent $e_i$, which defines a permutation $f_i$ over $\{0, 1, 2, \ldots, n_i-1\}$: $f_i(x)=x^{e_i}$ modulo $n_i$ (this permutation is the so-called RSA cipher function). The domain of the keys is widened to a common domain $[0, 2^b-1]$, this defining the integer b chosen such that $b \geq \log_2 (n_i)$ for any i and the set $B=\{0, 1, 2, \ldots, 2^b-1\}$. Typically, b=1024 or 2048 depending on the RSA keys of the users. This widening makes it possible to have keys of different sizes depending on the members of the group. The functions $g_i$ are defined from B into B. Denoting by $q_i(x)$ and $r_i(x)$ the quotient and the remainder of the Euclidian division of x by $n_i (x=q_i(x).n_i+r_i(x)$ with $0 \leq r_i(x) < n_i)$, we have:

if $(q_i(x)+1).n_i < 2^b$, then $g_i(x)=q_i(x).n_i+f_i(r_i(x))$; and if $(q_i(x)+1).n_i \geq 2^b$, then $g_i(x)=x$.

This function $g_i$ dependent on the public key $PUB_i$ is invertible and its inverse $h_i$ depends on the private key $PR_i$ associated with $PUB_i$:

if $(q_i(y)+1).n_i < 2^b$, then $h_i(y)=q_i(y).n_i+f_i^{-1}(r_i(y))$; and if $(q_i(y)+1).n_i \geq 2^b$, then $h_i(y)=y$, $f_i^{-1}$ being the RSA decipher function, the inverse of $f_i$, evaluated by means of the private key $PR_i$.

The combination C is defined by means on the one hand of a symmetric cipher function $CS_k$, constructed for example on the basis of a conventional algorithm such as DES ("Digital Encryption System"), AES ("Advanced Encryption System"), etc., and defining a permutation over B on the basis of a key k, and on the other hand of a hash function H, constructed for example on the basis of the conventional SHA-1 function and able to produce all the valid keys k. The key k is generated by hashing the message M to be signed: k=H(m). The combination function $C_{m,v}$ is then given by:

$$C_{m,v}(y_1, y_2, \ldots, y_r) = CS_k(y_r \oplus CS_k(y_{r-1} \oplus CS_k(y_{r-2} \oplus \ldots \oplus CS_k(y_1 \oplus v) \ldots )))$$

where $\oplus$ designates the EXCLUSIVE OR operation.

This combination function is invertible for any position s, the solving of the ring equation (1) consisting simply in calculating:

$u=CS_k(y_{s-1} \oplus CS_k(y_{s-2} \oplus \ldots \oplus CS_k(y_1 \oplus v) \ldots ))$;

$u'=DS_k(y_{s+1} \oplus DS_k(y_{s+2} \oplus \ldots \oplus DS_k(y_r \oplus DS_k(v)) \ldots ))$ by means of the symmetric deciphering function associated with $CS_k$; then $y_s = u \oplus u'$ The invention modifies this known ring-signature mechanism by replacing one at least of the randomly drawn values of variability parameters, i.e. v and/or $x_i$ for $i \neq s$, by an identity trace of the signatory $E_s$. Anonymity withdrawal data (AWD) are produced so as to be stored and kept secret by at least one anonymity withdrawal entity (AWE) in relation with an identification $ID_s$ of the signatory $E_s$. The identity trace, determined as a function of these AWD, subsequently makes it possible, if the need is felt, to revoke the anonymity afforded to the signatory by the ring-signature mechanism.

The AWE can be constituted by the signatory himself or by a trusted server supervised by an independent third party. It may also include both the signatory and such a trusted server.

With reference to the figures, depicted therein are the computer devices held by the possible signatories $E_i$ of the group E, which consist for example of computers or terminals capable of communicating with one another through one or more telecommunication networks (not shown) (for example an IP type network such as the Internet or an Intranet). These devices are equipped with programs suitable for implementing the steps described hereinbelow. It is assumed that each member of the group E knows the public keys $PUB_i$ of all the others. The identification of each member $E_i$ is effected by means of an identity $ID_i$, which may consist of the index i, the public key $PUB_i$, and a certificate of X.509 type or other, etc).

FIGS. 2 to 4, 6 and 8 also show a trusted server S usable in certain embodiments of the method. This server is linked to the telecommunication network and is also equipped with programs suitable for implementing the steps described hereinbelow. It may for example deploy a secure web server of SSLv3 type (see "The SSL Protocol-Version 3.0" Internet Draft, IETF, November 1996). Requests are then sent to it according to the HTTPS protocol with client authentication.

The signatures involved (token, proof of signatory) may all be stored in known structures of the type PKCS#7-signed-Data or XML-DSig. Signature verifications may if appropriate entail the verification of the certificates' trust chain.

In the embodiments of the invention illustrated by FIGS. 1 to 6, the variability parameter value taken equal to the identity trace is the value of the additional parameter v serving to close the signature ring.

In the embodiment of FIG. 1, the AWE is constituted by the signatory $E_s$. The latter's computer device draws a random number μ (step 1), which it stores as AWD in step 2, while keeping it secret. In step 3, the identity trace v is calculated by cryptographic hashing of the concatenation of the random number μ and of the message m to be signed:

$$v = h(\mu \| m)$$

In the present description, the notation w∥z designates the concatenation of any two messages w and z, h designates a cryptographic hash function taking its values in B, and h', h" designate hash functions that may be the same as or different from h. These hash functions h, h', h" may be chosen from among those conventionally employed in cryptographic applications (SHA-1, MD-5, etc.).

After having obtained the identity trace v, the signatory's device randomly draws values $x_i$ in B for $1 \leq i < s$ and $s < i \leq r$ in step 4 identical to the aforesaid step /b/, then executes the ring-signature in step 5 identical to the aforesaid steps /c/–/e/, with the values $x_i$ (i≠s) for the parameters associated with the other members of the group E and the value v for the additional variability parameter.

The ring-signature (PUB$_1$, PUB$_2$, . . . , PUB$_r$; v; $x_1$, $x_2$, . . . , $X_r$) may be appended to the message m to form the signed message M communicated by the signatory $E_s$. The ring-signature is verifiable by anybody according to the verification algorithm /f/–/h/ described previously.

The anonymity withdrawal can be requested by a verifier V having a computer device able to communicate with those of the members of the group E by way of the telecommunication network and programmed in such a way as to be able to undertake the operations hereinbelow.

In a first step 100, the verifier V makes sure of the validity of the ring-signature. If the ring equation (1) is not satisfied for the signed message M, the signature is declared invalid. If it is valid, the verifier addresses at least one AWD request to an AWE, for example by e-mail.

In the case of FIG. 1 (AWE=$E_s$), this AWD request is sent to the members of the group E, only $E_s$ being in a position to respond suitably thereto. If V guesses the identity of the signatory, he may send the request only to the latter. Otherwise, he addresses it to all the members of the group, either in succession until a satisfactory response is obtained, or simultaneously.

The AWD request can include the message m or a part thereof so that the recipient can know for which message an anonymity withdrawal is required. It may in particular include a hash h" (m) of the message m, that the signatory $E_s$ has also preserved in memory in step 2 in relation with the AWD. In the processing of the request, $E_s$ will thus be able to access the AWD required.

The signatory $E_s$ determines whether he accepts withdrawal of his anonymity vis-à-vis V, this possibly requiring prior authentication of V by $E_s$. Then, if he accepts, the stored AWD are read in step 6 and addressed to V in a message which may possibly be signed with the private key of $E_s$ to guarantee its origin to V. Receiving a value μ* (=AWD) in such a message originating from an identified member $E_t$, V verifies in step 101 whether it is a satisfactory response, i.e. whether h(μ*∥m) corresponds to the value v included in the ring-signature. If so, the anonymity of $E_s$ is withdrawn by V. Otherwise, anonymity is maintained and another member of the group may possibly be interrogated in his or her turn.

The signatory $E_s$ can also spontaneously withdraw his anonymity, by communicating μ to V (with m) or by publishing it on a website.

Figure 2:
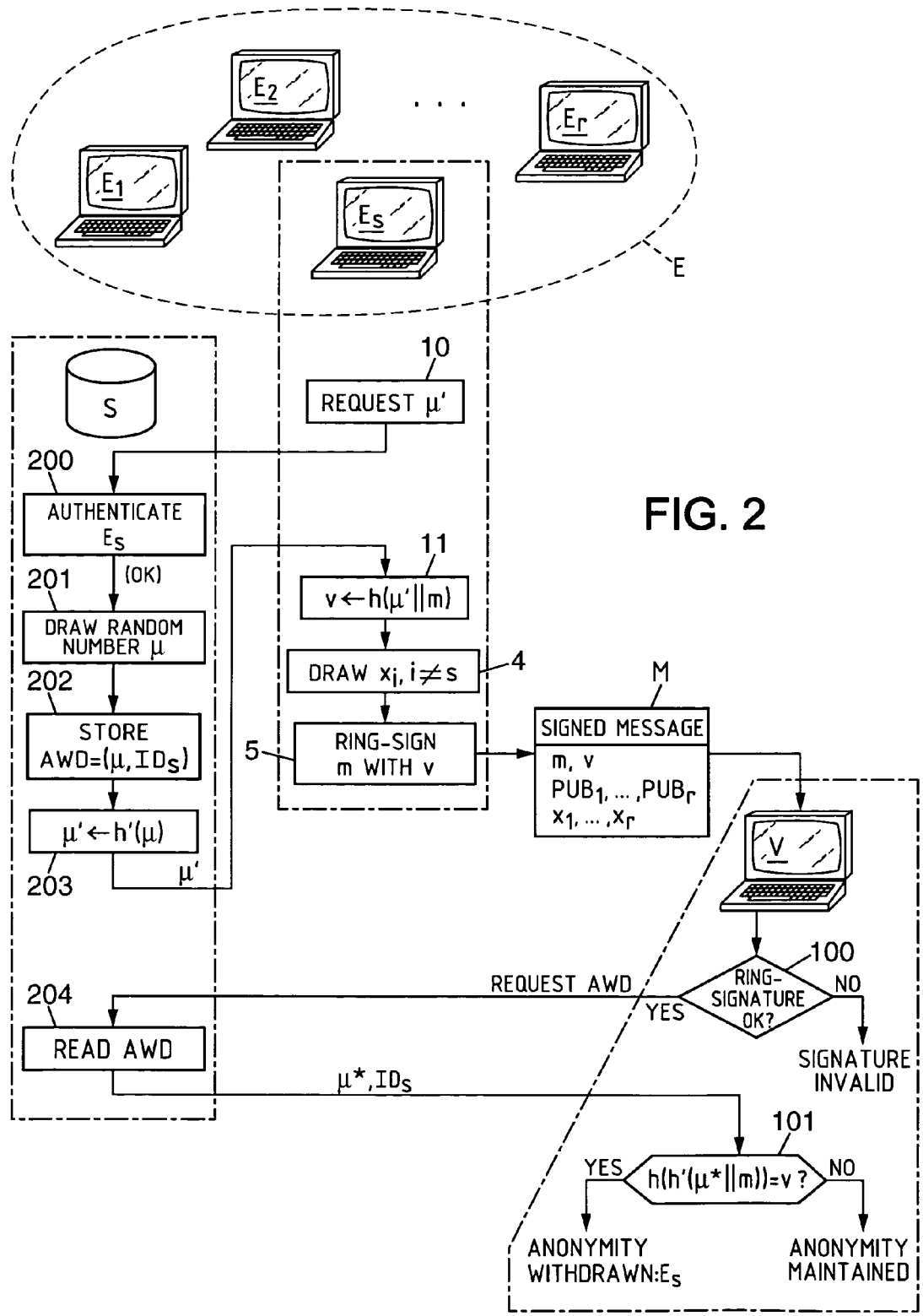

The variant illustrated by FIG. 2 allows the withdrawal of anonymity by virtue of an anonymity withdrawal third party supervising a trusted server S. The signatory $E_s$ generates a request for a random number μ' (step 10), that it addresses to the server S. This request may contain a hash h" (m) of the message m for reference purposes. The server S authenticates $E_s$ (step 200), for example within the framework of the establishing of an SSLv3 session or in accordance with the content of the message transporting the request. If $E_s$ is properly authenticated, the processing of the request by S comprises the drawing of a first random number μ (step 201) which is stored and kept secret in relation with the identity $ID_s$ of the signatory (step 202) and with h" (m). The value μ' is then calculated by hashing μ in step 203 (μ'=h'(μ)) then returned to $E_s$.

The identity trace v is obtained in step 11 by the signatory $E_s$ by cryptographic hashing of the concatenation of μ' and of the message to be signed m (or of just a part thereof): v=h (μ'∥m). The aforesaid steps 4 and 5 are then executed to produce the ring-signature.

After verification 100 of this ring-signature, V sends its AWD request to the trusted server S. This request may be accompanied by the hash h" (m) for message identification purposes. The server S can then read the requested AWD (step 204) and return them to V. Verification 101 allowing V to withdraw the anonymity then consists in testing whether h(h' (μ*∥m))=v, where μ* is the random number value received from S. If the test is positive, V identifies $E_s$ according to the identity obtained in the AWD.

It is noted that, in this embodiment, the server S has no knowledge of the message m before recording the AWD and that it cannot therefore a priori censor $E_s$ (a cryptographic hash such as h" (m) does not give access to the content of m).

FIGS. 3 to 6 illustrate embodiments of the invention making it possible, once anonymity has been withdrawn, to have proof (authenticated withdrawals of anonymity). In these embodiments, there is a proof collection phase in respect of anonymity withdrawal, during which an entity produces a proof p that may in particular include the identity $ID_s$ of the signatory and the message m. This proof is preserved as AWD by one or more AWE (trusted third parties and/or $E_s$ itself). If $E_s$ is not an AWE, an AWE sends $E_s$ a hash q=h(p) which will serve as identity trace. After verification of the AWD, V can apply an algorithm for verifying the proof of anonymity withdrawal which returns $ID_s$ if the proof is valid and which denies the anonymity withdrawal if the proof is invalid.

The proof can in particular be generated by electronic signing of a token J composed by concatenating a random number μ, the message m (or a part of the latter, in particular a hash) and of possible extensions. The signing of the token J can be performed by $E_s$ or by a trusted server S. In the latter case, it is judicious for the token J to also contain an identity $ID_s$ of the signatory. The extensions of the token may comprise a serial number or other useful data. In an advantageous embodiment, these extensions include a timestamping token generated during composition of the token to be signed. This timestamping token can in particular be generated according to the TSP protocol ("Time Stamp Protocol", see RFC 3161, "Internet X.509 Public Key Infrastructure Time-Stamp Protocol (TSP), August 2001, IETF); it then contains the date and the time of the token J and it is signed by a timestamping third party.

Figure 3:
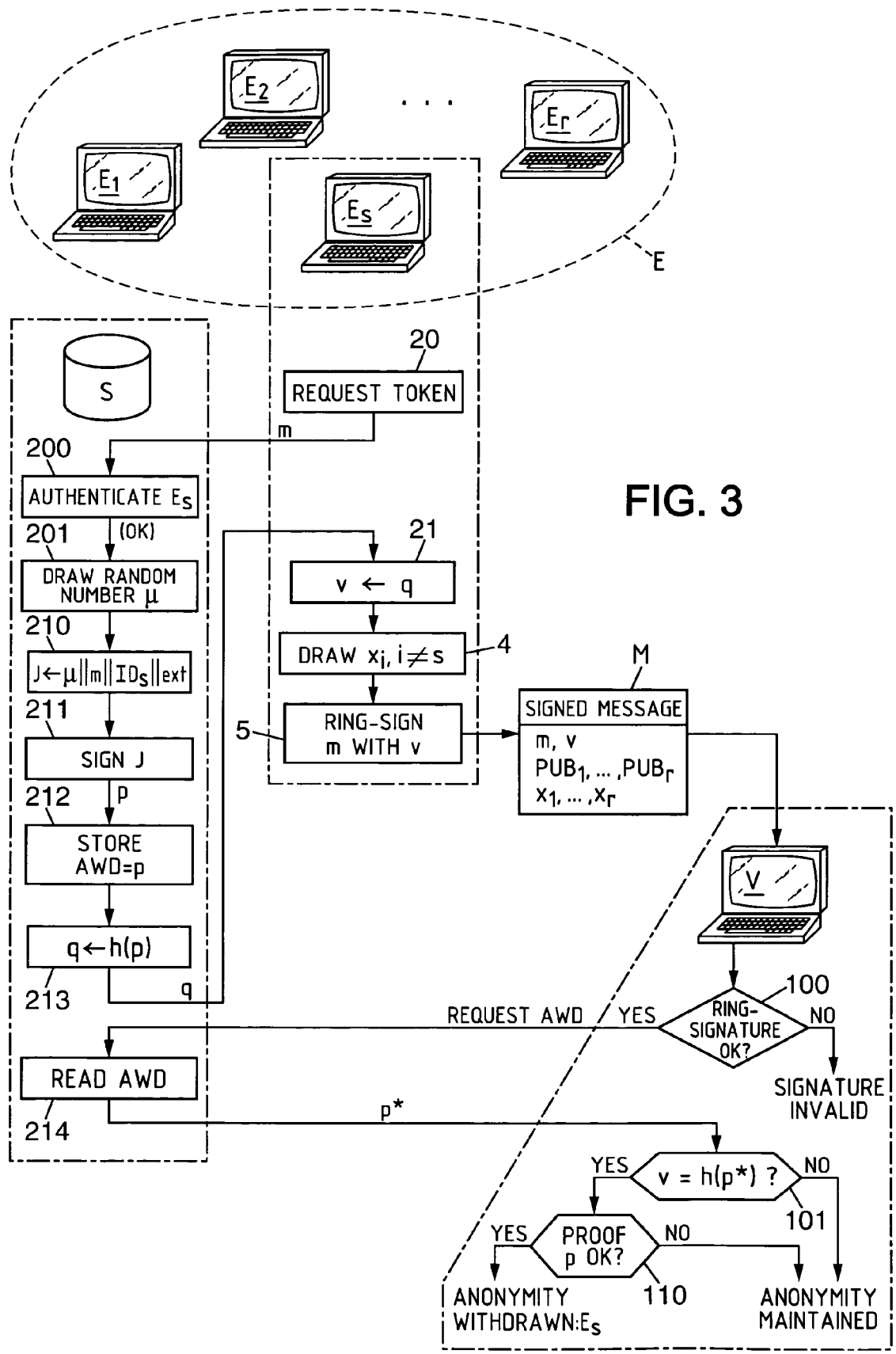

In the embodiment according to FIG. 3, the AWE consists of a trusted server S.

The signatory $E_s$ generates a token request (step 20), that it addresses to the server S together with the message m or a part of the latter (this part may in particular consist of a hash h" (m) of the message m, thereby allowing S to generate the proof p without knowing the content of the message m). The server S authenticates $E_s$ (200) and draws a random number μ (201) as previously. It then composes the token J in step 210: J=μ∥m∥$ID_s$∥ ext or J=μ∥h" (m)∥$ID_s$∥ ext, where ext designates the optional extensions. The server S then signs the token J by means of its private key in step 211, thereby producing the proof p stored in step 212. In step 213, it then calculates the value q=h(p), returned to $E_s$ as response to the latter's request.

The identity trace v is taken equal to this value q in step 21 by the signatory $E_s$. The aforesaid steps 4 and 5 are then executed to produce the ring-signature.

After verification 100 of this ring-signature, V sends his AWD request to the trusted server S. This request can be accompanied by the message m or by the hash h" (m) for message identification purposes. The server S can then read the requested AWD (step 214) and return them to V. Verification 101 allowing V to withdraw the anonymity then consists in testing whether h(p*)=v, where p* is the proof received from S. If the test is positive, V proceeds to verifications 110 according to the proof p. The withdrawal of the anonymity of $E_s$ is effective only if these verifications are all positive. In step 110, V verifies:

consistency between the m found in p (or its hash h" (m)) and the message of the ring-signature M;
validity of $ID_s$ and its consistency with $PUB_s$;
validity of any extensions; and
validity of the signature of the token J by S, by means of the public key of S.

Figure 4:
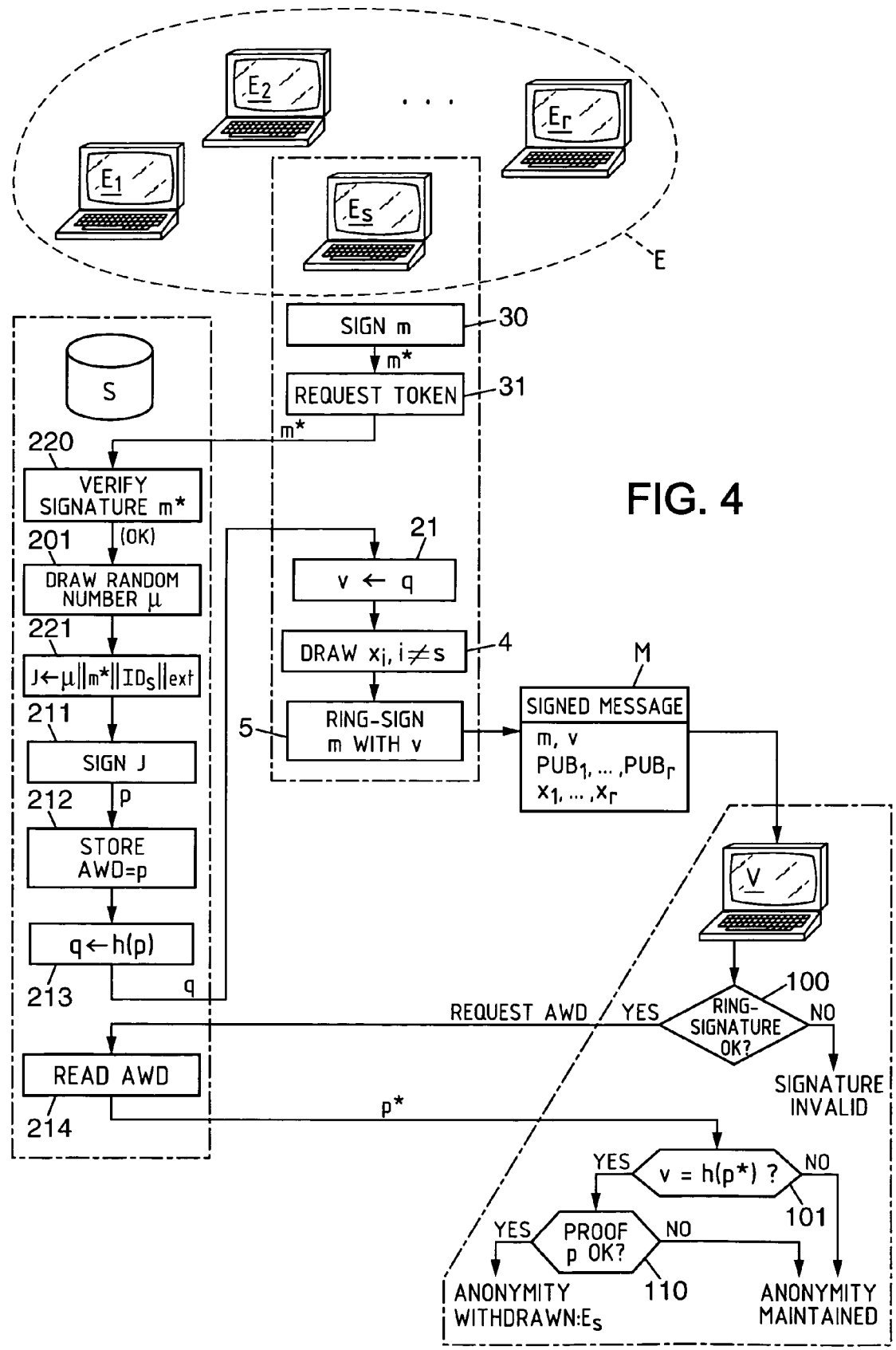

The embodiment illustrated by FIG. 4 is similar to that of FIG. 3, except that $E_s$ signs the message m by means of its private key $PR_s$ (step 30), and sends S the signed message m* in the token request generated in step 31. The server S verifies this signature by means of the public key $PUB_s$ (step 220), draws the random number μ then composes the token in step 221 with the signed message m*: J=μ||m*||$ID_s$|| ext. The other operations are the same as those of FIG. 3. In step 110, V will be able to perform a further verification on the proof p, as to the validity of the signature of the message m by $E_s$, by means of the public key $PUB_s$ of $E_s$. This further verification makes it possible to render the withdrawal of the anonymity of $E_s$ non-repudiable.

Figure 5:
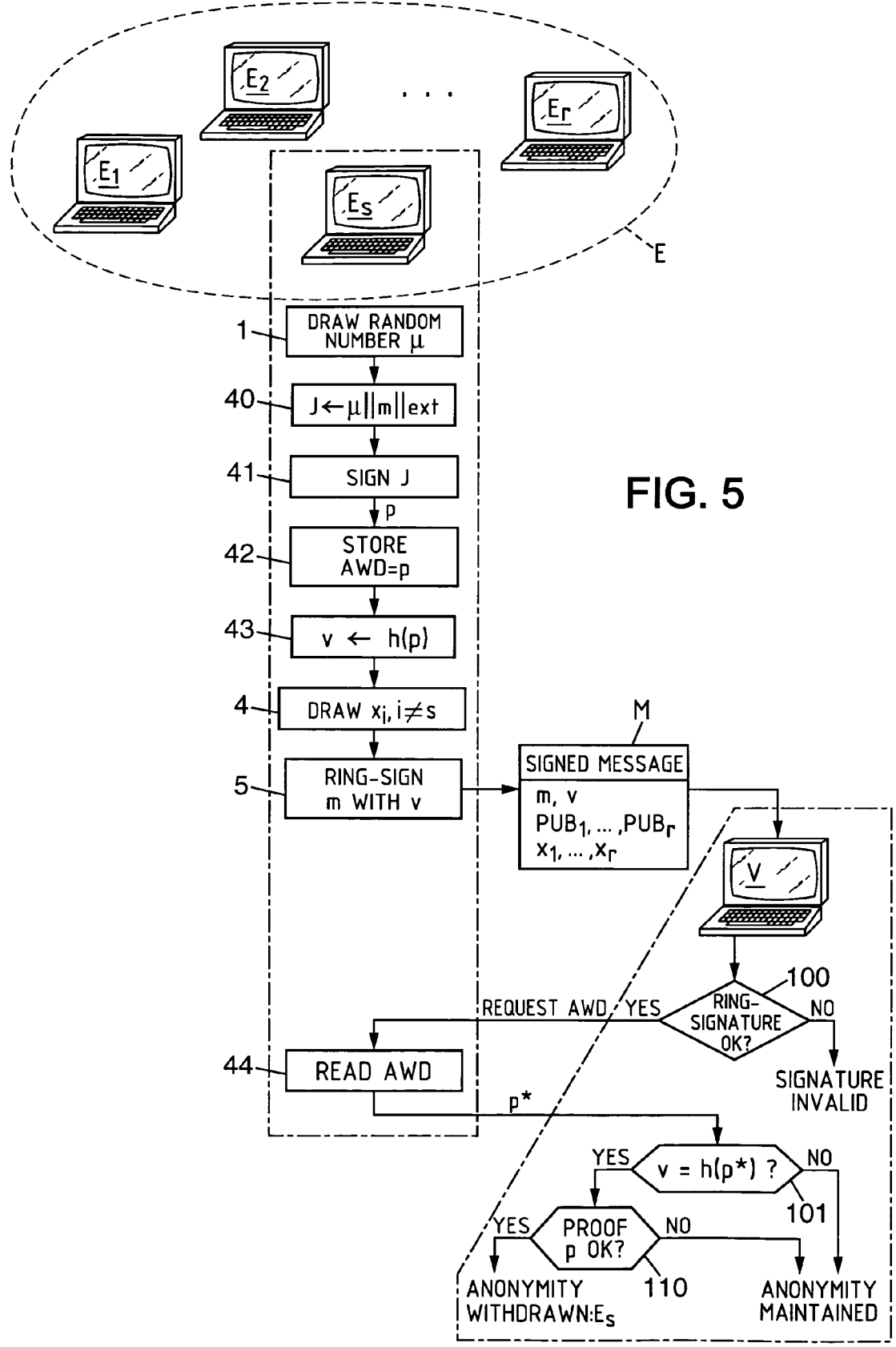

Such non-repudiation can also be obtained by having the token J signed by the anonymous signatory $E_s$, in an embodiment according to FIG. 5 which does not involve any trusted third party. A random number μ is firstly drawn (step 1) in the computer device of the signatory $E_s$, which composes the token J in step 40: J=μ||m|| ext or J=μ||h" (m)|| ext. This token J is then signed by means of the private key $PR_s$ (step 41), and the result (proof p) is stored as AWD in step 42 (if necessary in relation with a hash h" (m) of the message). In step 43, $E_s$ determines the identity trace v=h(p), which it uses to establish the ring-signature as previously (steps 4 and 5). The AWD read in step 44 in response to the request of the verifier V comprise the proof p verified as previously in step 110 (except in that the signature of p is verified by means of the public key $PUB_s$).

Figure 6:
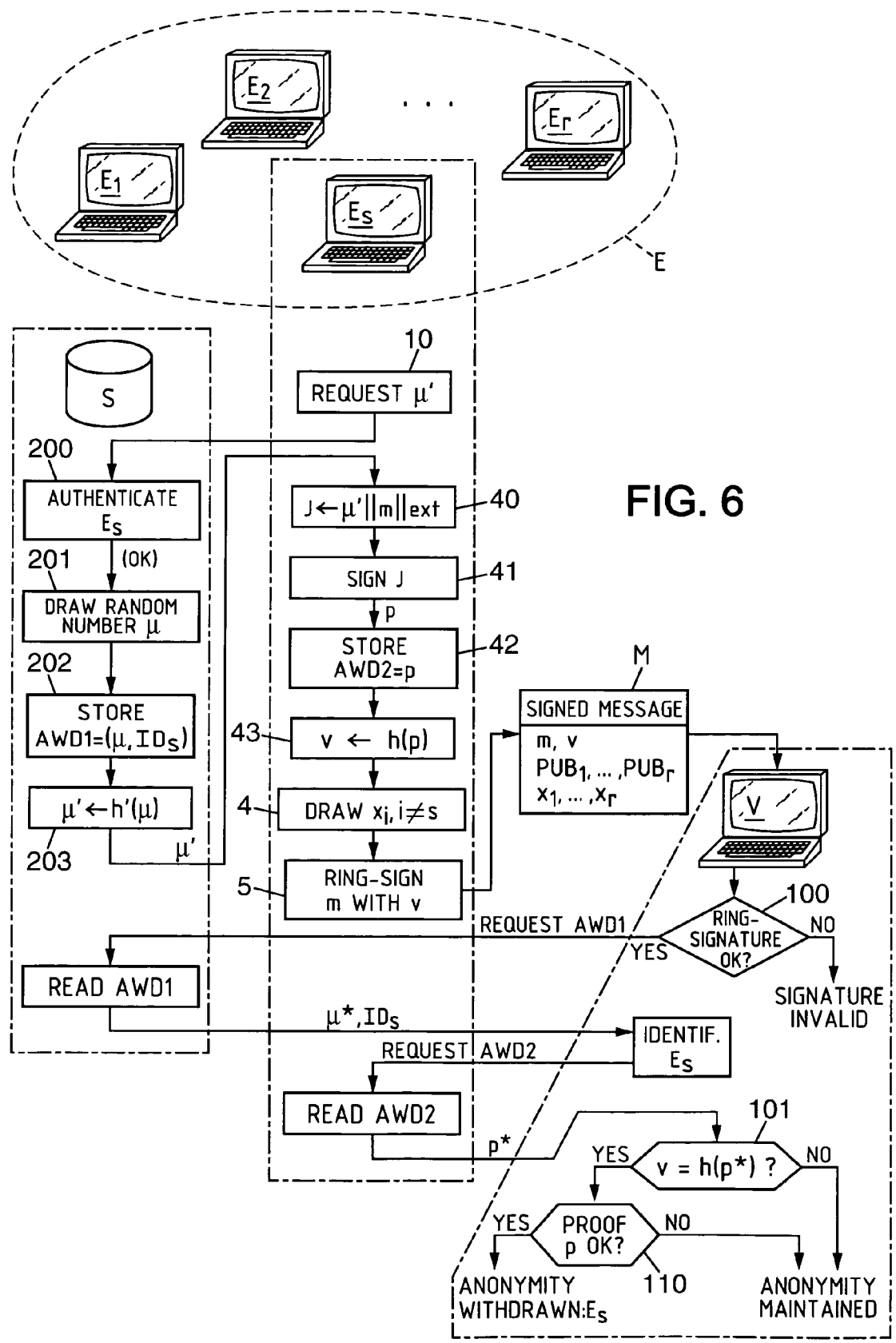

In the variant of FIG. 6, the AWE consists jointly of the trusted server S and of the anonymous signatory $E_s$, and the AWD are subdivided into a first part AWD1=(μ, $ID_s$) preserved by S and a second part AWD2=p preserved by $E_s$. The latter begins by asking S for a random number μ' as in the case of FIG. 2 (steps 10 and 200-203), this random number μ' being produced by hashing a first random number μ preserved and kept secret with $ID_s$ (and possibly h" (m)) by S as AWD1. The signatory $E_s$ composes the token J in step 40 with the value μ' returned by S (J=μ'||m'|| ext) , then he signs it in step 41 so as to obtain the proof p stored in step 42 as AWD2. The subsequent operations are similar to those of FIG. 5, except that during the anonymity withdrawal, V firstly addresses itself to S to obtain AWD1=(μ, $ID_s$), this allowing the latter to identify $E_s$, then to Es to obtain the proof p. The verification 110 can also pertain to the fact that the value μ' found in the signed token does indeed result from the hashing of the random number μ returned by S in the AWD1s.

Figure 7:
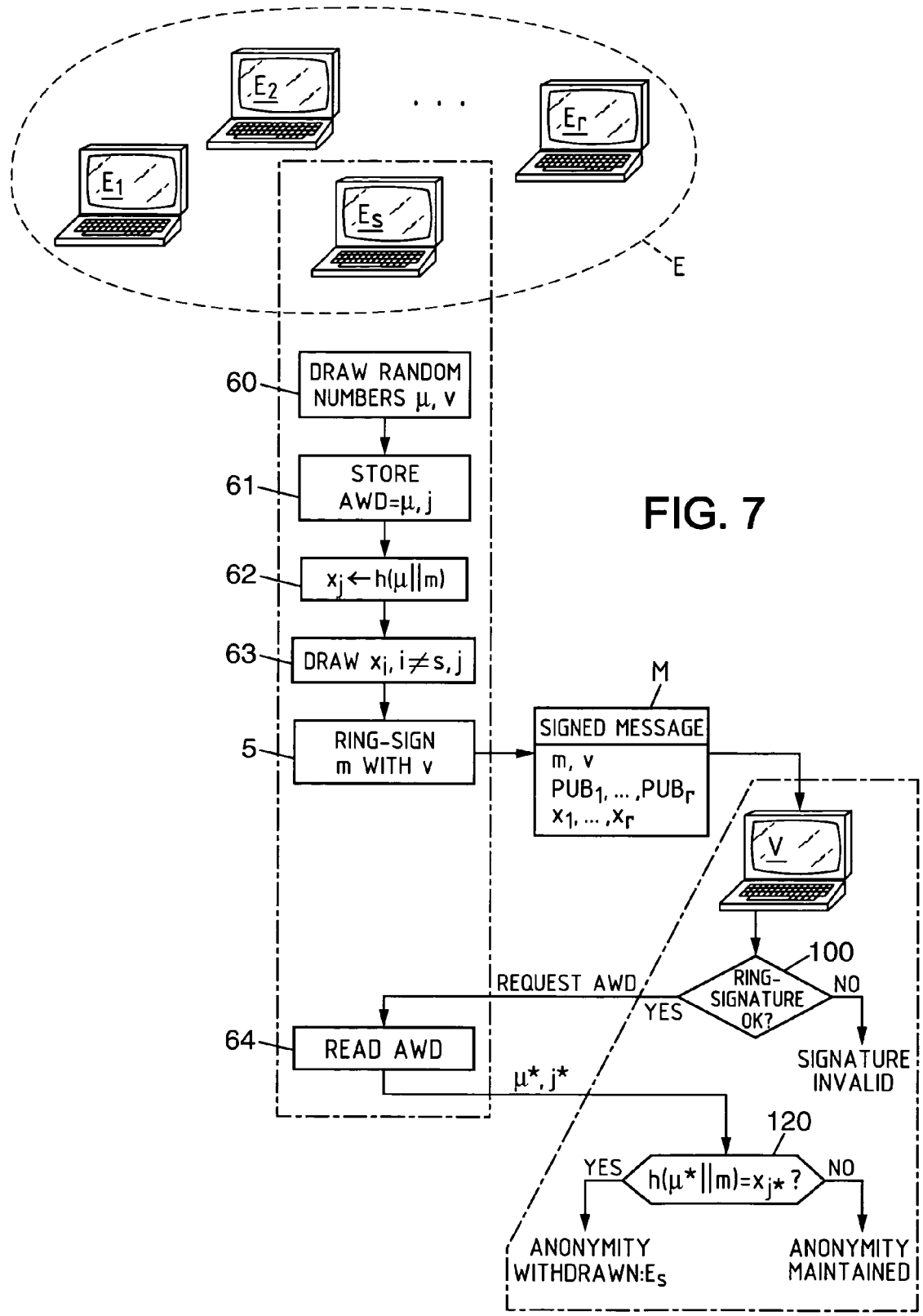

In the embodiment of the invention illustrated by FIG. 7, the value of variability parameter taken equal to the identity trace is not v but the value of one of the parameters $x_j$ associated with the other members $E_i$ of the group E (j≠s). The index j is then chosen arbitrarily by the signatory $E_s$ and appended to the AWD. The variable v then again becomes a random number.

In step 60, $E_s$ draws two random numbers μ and v. The AWD recorded in step 61 comprise the values of the random number μ and of the index j (and possibly a hash h" (m) of the message m). The value of the parameter $x_j$ associated with $E_j$ is calculated in step 62 according to: $x_j$=h (μ||m), and in step 63, $E_s$ draws random values of the other $x_i$, i.e. for i≠s and i≠j. The ring-signature is then executed as previously in step 5.

During anonymity withdrawal, $E_s$ reads the AWD stored in step 64 and addresses them to V. On the basis of these data μ*, j*, the verification 120 allowing anonymity withdrawal consists in testing whether h(μ*||m)=$x_j$.

If several signatories agree to sign a message in the name of a group E to which they belong, it is possible to use the method described hereinabove, and all its variants, in order to devise a multi-signature protocol involving one or more co-signatories in addition to $E_s$.

The multi-signature protocol can run as follows:
one of the signatories $E_s$ summons the other or others to obtain their agreement;
each co-signatory $E_t$ returns his own identity trace determined by one of the above variants to $E_s$ or has it sent back to the latter
$E_s$ determines his own identify trace;
$E_s$ determines the identity trace of each co-signatory $E_t$ in place of the value of the parameter $x_j$ which is respectively associated therewith (as in the case of FIG. 7), and his own identity trace as variable v for executing the ring-signature.

The anonymity withdrawal can then be partial: certain co-signatories may choose to reveal themselves, others not necessarily. If every one is passed by a third party, the latter can withdraw the anonymity of everyone simultaneously.

Figure 8:
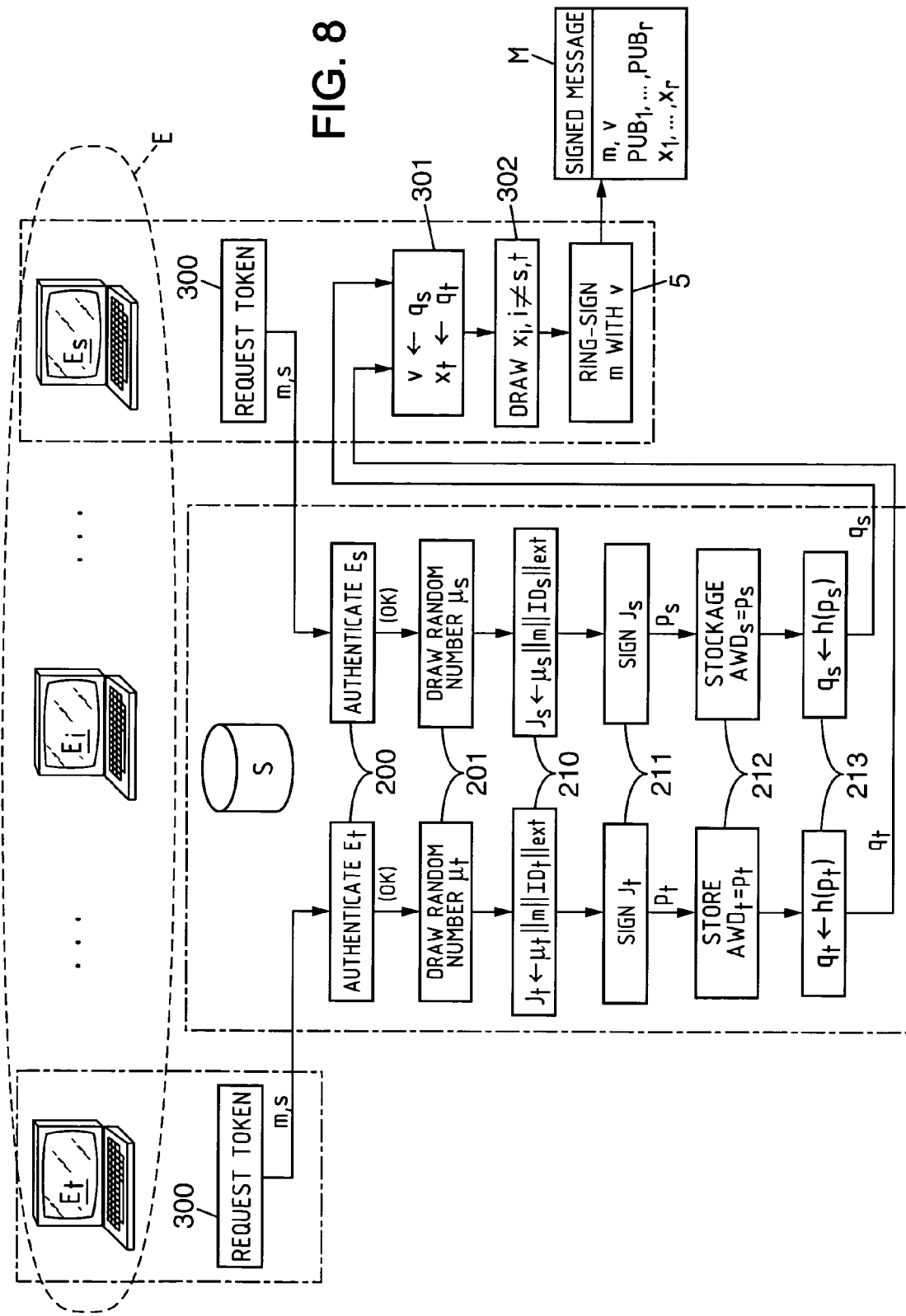

FIG. 8 illustrates an embodiment of the multi-signature, where there is a co-signatory $E_t$ in addition to the main signatory $E_s$ who executes the ring-signature.

The signatories $E_s$, $E_t$ confer so as to agree to sign the message m in common, with $E_s$ as main signatory, then they each send a token request to the trusted server S (steps 300). This request contains the message m to be signed (or h" (m) or else the message m signed with the private key of the sender), as well as the designation s of the main signatory. Before returning these requests, S can verify their compatibility, i.e. that the messages m transmitted with the respective requests of the various signatories are indeed the same and that they all designate the same main signatory. For each signatory, S then separately executes steps 200, 201, and 210-213 similar to those of FIG. 3 to produce two distinct proofs $p_s$, $p_t$ whose hashed versions $q_s$=h($p_s$) and $q_t$=h($p_t$) are returned to $E_s$ as identity traces of $E_s$ and $E_t$, respectively. The main signatory $E_s$ then assigns the identity traces $q_s$ and $q_t$ to the variables v and $x_t$ (step 301), then he randomly draws the values of the other parameters $x_i$ (i≠s and i≠t) in step 302 before executing the ring-signature in step 5.

The proofs $p_s$ and $p_t$ can then be verified separately or simultaneously by V at the server S.

Two multi-signature cases in particular are interesting:
the signatories use unauthenticated identity traces; this yields a "common suggestion box" concept, the signatories wishing to claim their collaboration;
the signatories use authenticated identity traces (for example according to FIG. 8): a cryptographic trace of a kind of group deliberation is thus retained. The ring-signature behaves like a commitment of the signatories who preserve their anonymity. Anonymity can however be withdrawn if need be.

We claim:

1. A method of electronic signing a message by an anonymous signatory belonging to a group of r possible signatories each having an associated public key and an associated private key in an asymmetric cryptography scheme, r being an integer greater than 1, the method comprising the following steps executed in an electronic signature device of the anonymous signatory:

obtaining at least r values of variability parameters including the values of r-1 variability parameters respectively associated with the other possible signatories of the group and at least one additional parameter value;

enciphering the values of the r-1 variability parameters associated with the other possible signatories of the group, by means of the respective public keys of said other possible signatories, thereby producing r-1 enciphered values respectively associated with the other possible signatories of the group;

determining a complementary value which satisfies a ring equation whose variables are the message to be signed, each of the r-1 enciphered values associated with the other possible signatories of the group, each additional parameter value and said complementary value;

deciphering the complementary value determined, by means of the private key of the anonymous signatory, thereby producing the value of a variability parameter associated with the anonymous signatory; and delivering an electronic signature of the message comprising the respective public keys of the r possible signatories of the group, the values of the variability parameters respectively associated with the r possible signatories of the group and each additional parameter value, wherein at least one of the r variability parameter values is an identity trace of the anonymous signatory, determined as a function of anonymity withdrawal data stored and kept secret by at least one anonymity withdrawal entity in relation with an identification of the anonymous signatory;

the method further comprising:

authenticating the anonymous signatory at the anonymity withdrawal entity;

drawing a random value at the anonymity withdrawal entity;

storing and keeping secret at least said random value and an identification of the anonymous signatory as anonymity withdrawal data at the anonymity withdrawal entity;

transmitting from the anonymity withdrawal entity to the electronic signature device of the anonymous signatory an intermediate value obtained by cryptographic hashing of said random value; and generating the identity trace of the anonymous signatory at the device of the anonymous signatory as a function of the intermediate value received from the anonymity withdrawal entity.

2. The method as claimed in claim 1, wherein the identity trace of the anonymous signatory is generated by hashing a concatenation of elements comprising at least the intermediate value received from the anonymity withdrawal entity and part at least of the message to be signed.

3. The method as claimed in claim 2, wherein the concatenated elements further comprise a timestamping token.

4. The method as claimed in claim 2, wherein said part of the message to be signed is obtained by the electronic signature device of the anonymous signatory by cryptographic hashing of said message to be signed, and transmitted to the server for the composition of the token to be signed.

5. A method of electronic signing a message by an anonymous signatory belonging to a group of r possible signatories each having an associated public key and an associated private key in an asymmetric cryptography scheme, r being an integer greater than 1, the method comprising the following steps executed in an electronic signature device of the anonymous signatory:

obtaining at least r values of variability parameters including the values of r-1 variability parameters respectively associated with the other possible signatories of the group and at least one additional parameter value;

enciphering the values of the r-1 variability parameters associated with the other possible signatories of the group, by means of the respective public keys of said other possible signatories, thereby producing r-1 enciphered values respectively associated with the other possible signatories of the group;

determining a complementary value which satisfies a ring equation whose variables are the message to be signed, each of the r-1 enciphered values associated with the other possible signatories of the group, each additional parameter value and said complementary value;

deciphering the complementary value determined, by means of the private key of the anonymous signatory, thereby producing the value of a variability parameter associated with the anonymous signatory; and delivering an electronic signature of the message comprising the respective public keys of the r possible signatories of the group, the values of the variability parameters respectively associated with the r possible signatories of the group and each additional parameter value, wherein at least one of the r variability parameter values is an identity trace of the anonymous signatory, determined as a function of anonymity withdrawal data stored and kept secret by at least one anonymity withdrawal entity in relation with an identification of the anonymous signatory;

the method further comprising:

generating a proof signed by means of a private key and depending on an identification of the anonymous signatory and on the message to be signed;

storing and keeping secret at least said proof as anonymity withdrawal data at the anonymity withdrawal entity; and generating the identity trace of the anonymous signatory by cryptographic hashing of data including said proof.

6. The method as claimed in claim 5, further comprising the following steps executed in a server supervised by a third party:

authenticating the anonymous signatory;

drawing a random value; and composing a token to be signed by concatenating elements comprising at least said random value, at least a part, received from the anonymous signatory, of the message to be signed, and the identification of the anonymous signatory, and wherein said proof is produced by signing the token to be signed.

7. The method as claimed in claim 6, wherein the concatenated elements further comprise a timestamping token.

8. The method as claimed in claim 6, wherein said part of the message to be signed is obtained by the electronic signature device of the anonymous signatory by cryptographic hashing of said message to be signed, and transmitted to the server for the composition of the token to be signed.

9. The method as claimed in claim 6, wherein the anonymity withdrawal entity includes the server supervised by the third party, and wherein the proof is signed by means of a private key of the third party.

10. The method as claimed in claim 5, further comprising the steps of:
   signing the message by means of the private key of the anonymous signatory and transmitting the message thus signed to a server supervised by a third party;
   authenticating the anonymous signatory at the server and verifying the signature of the message by means of the public key of the anonymous signatory;
   drawing a random value at the server; and
   composing a token to be signed at the server by concatenating elements comprising at least said random value, at least part of the message signed by means of the private key of the anonymous signatory and the identification of the anonymous signatory,
   and wherein said proof is produced by signing the token to be signed.

11. The method as claimed in claim 10, wherein the concatenated elements further comprise a timestamping token.

12. The method as claimed in claim 10, wherein the anonymity withdrawal entity includes the server supervised by the third party, and wherein the proof is signed by means of a private key of the third party.

13. The method as claimed in claim 5, wherein the anonymity withdrawal entity includes the anonymous signatory, and wherein the proof is signed by means of the private key of the anonymous signatory.

14. The method as claimed in claim 13, wherein the anonymity withdrawal entity includes a server supervised by a third party.

15. The method as claimed in claim 13, further comprising the steps of:
   authenticating the anonymous signatory at the server;
   drawing a random value at the server;
   storing and keeping secret at least said random value and an identification of the anonymous signatory as first anonymity withdrawal data at the server;
   transmitting from the server to the electronic signature device of the anonymous signatory an intermediate value obtained by cryptographic hashing of said random value;
   composing a token to be signed by concatenating elements comprising at least said intermediate value and at least part of the message to be signed;
   signing the token at the device of the anonymous signatory to produce said proof and
   storing and keeping secret at least said proof as second anonymity withdrawal data at the device of the anonymous signatory.

16. The method as claimed in claim 15, wherein the concatenated elements further comprise a timestamping token.

17. The method as claimed in claim 15, wherein said part of the message to be signed is obtained by the electronic signature device of the anonymous signatory by cryptographic hashing of said message to be signed, and transmitted to the server for the composition of the token to be signed.

18. The method as claimed in claim 1, wherein the anonymity withdrawal data are stored in relation with a reference obtained by cryptographic hashing of at least the message to be signed.

19. The method as claimed in claim 1, wherein the identity trace of the anonymous signatory is obtained by cryptographic hashing of a concatenation of the anonymity withdrawal data and of at least part of the message to be signed.

20. The method as claimed in claim 1, wherein the identity trace of the anonymous signatory is distinct from the values of the r-1 variability parameters associated with the other possible signatories of the group.

21. The method as claimed in claim 1, wherein the identity trace of the anonymous signatory comprises at least one value selected from the r-1 variability parameters associated with the other possible signatories of the group and wherein the anonymity withdrawal data include a tag of the selected value.

22. A method of electronic signing a message by an anonymous signatory belonging to a group of r possible signatories each having an associated public key and an associated private key in an asymmetric cryptography scheme, r being an integer greater than 1, the method comprising the following steps executed in an electronic signature device of the anonymous signatory:
   obtaining at least r values of variability parameters including the values of r-1 variability parameters respectively associated with the other possible signatories of the group and at least one additional parameter value;
   enciphering the values of the r-1 variability parameters associated with the other possible signatories of the group, by means of the respective public keys of said other possible signatories, thereby producing r-1 enciphered values respectively associated with the other possible signatories of the group;
   determining a complementary value which satisfies a ring equation whose variables are the message to be signed, each of the r-1 enciphered values associated with the other possible signatories of the group, each additional parameter value and said complementary value;
   deciphering the complementary value determined, by means of the private key of the anonymous signatory, thereby producing the value of a variability parameter associated with the anonymous signatory; and
   delivering an electronic signature of the message comprising the respective public keys of the r possible signatories of the group, the values of the variability parameters respectively associated with the r possible signatories of the group and each additional parameter value,
   wherein at least one of the r variability parameter values is an identity trace of the anonymous signatory, determined as a function of anonymity withdrawal data stored and kept secret by at least one anonymity withdrawal entity in relation with an identification of the anonymous signatory; and
   wherein the electronic signature device of the anonymous signatory receives an identity trace of at least one co-signatory distinct from the anonymous signatory and belonging to the group of possible signatories, said identity trace being generated by means of complementary anonymity withdrawal data respectively stored and kept secret for said co-signatory, and wherein the electronic signature device of the anonymous signatory uses said identity trace of the co-signatory as a value of the variability parameter associated with said co-signatory.

23. The method as claimed in claim 22, wherein each co-signatory turns to a server supervised by a third party for the production of the complementary anonymity withdrawal data, the identity trace of each co-signatory being received by the electronic signature device of the anonymous signatory from said server.

24. An electronic signature device for signing messages by an anonymous signatory belonging to a group of r possible signatories each having an associated public key and an associated private key in an asymmetric cryptography scheme, r being an integer greater than 1, the anonymous signatory being authenticated at an anonymity withdrawal entity, the electronic signature device comprising:
- means for obtaining at least r values of variability parameters including the values of r-1 variability parameters respectively associated with the other possible signatories of the group and at least one additional parameter value;
- means for enciphering the values of the r-1 variability parameters associated with the other possible signatories of the group, by means of the respective public keys of said other possible signatories, thereby producing r-1 enciphered values respectively associated with the other possible signatories of the group;
- means for determining a complementary value which satisfies a ring equation whose variables are the message to be signed, each of the r-1 enciphered values associated with the other possible signatories of the group, each additional parameter value and said complementary value;
- means for deciphering the complementary value determined, by means of the private key of the anonymous signatory, thereby producing the value of a variability parameter associated with the anonymous signatory; and
- means for delivering an electronic signature of the message comprising the respective public keys of the r possible signatories of the group, the values of the variability parameters respectively associated with the r possible signatories of the group and each additional parameter value,
- wherein at least one of the r variability parameter values is an identity trace of the anonymous signatory, determined as a function of anonymity withdrawal data stored and kept secret by at least one anonymity withdrawal entity in relation with an identification of the anonymous signatory, and wherein the means for obtaining the at least r values of variability parameters include means for generating the identity trace of the anonymous signatory as a function of an intermediate value received from the anonymity withdrawal entity, the intermediate value being obtained by cryptographic hashing of a random value stored and kept secret with an identification of the anonymous signatory as anonymity withdrawal data at the anonymity withdrawal entity.

25. A computer program product to be installed in an electronic signature device for electronic signing messages by an anonymous signatory belonging to a group of r possible signatories each having an associated public key and an associated private key in an asymmetric cryptography scheme, r being an integer greater than 1, comprising instructions for implementing the following steps when executed by processing means of said signature device:
- obtaining at least r values of variability parameters including the values of r-1 variability parameters respectively associated with the other possible signatories of the group and at least one additional parameter value, wherein at least one of the r variability parameter values is an identity trace of the anonymous signatory, determined as a function of anonymity withdrawal data stored and kept secret by at least one anonymity withdrawal entity in relation with an identification of the anonymous signatory, the obtaining of the at least r values of variability parameters including generating the identity trace of the anonymous signatory as a function of an intermediate value received from the anonymity withdrawal entity, the intermediate value being obtained by cryptographic hashing of a random value stored and kept secret with an identification of the anonymous signatory as anonymity withdrawal data at the anonymity withdrawal entity;
- enciphering the values of the r-1 variability parameters associated with the other possible signatories of the group, by means of the respective public keys of said other possible signatories, thereby producing r-1 enciphered values respectively associated with the other possible signatories of the group;
- determining a complementary value which satisfies a ring equation whose variables are the message to be signed, each of the r-1 enciphered values associated with the other possible signatories of the group, each additional parameter value and said complementary value;
- deciphering the complementary value determined, by means of the private key of the anonymous signatory, thereby producing the value of a variability parameter associated with the anonymous signatory; and
- delivering an electronic signature of the message comprising the respective public keys of the r possible signatories of the group, the values of the variability parameters respectively associated with the r possible signatories of the group and each additional parameter value.

26. A method for withdrawing anonymity of the anonymous signatory of an electronically signed message, wherein the anonymous signatory belongs to a group of r possible signatories each having an associated public key and an associated private key in an asymmetric cryptography scheme, r being an integer greater than 1, wherein the electronic signature of said message is generated in a process comprising the following steps executed in an electronic signature device of the anonymous signatory:
- obtaining at least r values of variability parameters including the values of r-1 variability parameters respectively associated with the other possible signatories of the group and at least one additional parameter value, wherein at least one of the r variability parameter values is an identity trace of the anonymous signatory, determined as a function of anonymity withdrawal data stored and kept secret by at least one anonymity withdrawal entity in relation with an identification of the anonymous signatory, the obtaining of the at least r values of variability parameters including generating the identity trace of the anonymous signatory as a function of an intermediate value received from the anonymity withdrawal entity, the intermediate value being obtained by cryptographic hashing of a random value stored and kept secret with an identification of the anonymous signatory as anonymity withdrawal data at the anonymity withdrawal entity;
- enciphering the values of the r-1 variability parameters associated with the other possible signatories of the group, by means of the respective public keys of said other possible signatories, thereby producing r-1 enciphered values respectively associated with the other possible signatories of the group;
- determining a complementary value which satisfies a ring equation whose variables are the message to be signed, each of the r-1 enciphered values associated with the other possible signatories of the group, each additional parameter value and said complementary value;

deciphering the complementary value determined, by means of the private key of the anonymous signatory, thereby producing the value of a variability parameter associated with the anonymous signatory; and delivering an electronic signature of the message comprising the respective public keys of the r possible signatories of the group, the values of the variability parameters respectively associated with the r possible signatories of the group and each additional parameter value, the method for withdrawing anonymity comprising the steps of:

verifying the electronic signature of the message, by extracting from the electronic signature of the message the respective public keys of the r possible signatories of the group, the values of the variability parameters respectively associated with the r possible signatories of the group and each additional parameter value, by obtaining r enciphered values by enciphering the values of the variability parameters associated with the r possible signatories of the group by means of their respective public keys, and by making sure that the message, the r enciphered values and each additional value together satisfy the ring equation;

recovering the anonymity withdrawal data stored by the anonymity withdrawal entity in relation with the identification of the anonymous signatory;

recalculating the identity trace of the anonymous signatory as a function of the anonymity withdrawal data recovered; and verifying that the recalculated identity trace corresponds to the identity trace included in the r values of variability parameters forming part of the electronic signature of the message.

27. A computer device for withdrawing anonymity of at least one anonymous signatory of an electronically signed message, wherein the anonymous signatory belongs to a group of r possible signatories each having an associated public key and an associated private key in an asymmetric cryptography scheme, r being an integer greater than 1, wherein the electronic signature of said message is generated in a process comprising the following steps executed in an electronic signature device of the anonymous signatory:

obtaining at least r values of variability parameters including the values of r-1 variability parameters respectively associated with the other possible signatories of the group and at least one additional parameter value, wherein at least one of the r variability parameter values is an identity trace of the anonymous signatory, determined as a function of anonymity withdrawal data stored and kept secret by at least one anonymity withdrawal entity in relation with an identification of the anonymous signatory, the obtaining of the at least r values of variability parameters including generating the identity trace of the anonymous signatory as a function of an intermediate value received from the anonymity withdrawal entity, the intermediate value being obtained by cryptographic hashing of a random value stored and kept secret with an identification of the anonymous signatory as anonymity withdrawal data at the anonymity withdrawal entity;

enciphering the values of the r-1 variability parameters associated with the other possible signatories of the group, by means of the respective public keys of said other possible signatories, thereby producing r-1 enciphered values respectively associated with the other possible signatories of the group;

determining a complementary value which satisfies a ring equation whose variables are the message to be signed, each of the r-1 enciphered values associated with the other possible signatories of the group, each additional parameter value and said complementary value;

deciphering the complementary value determined, by means of the private key of the anonymous signatory, thereby producing the value of a variability parameter associated with the anonymous signatory; and delivering an electronic signature of the message comprising the respective public keys of the r possible signatories of the group, the values of the variability parameters respectively associated with the r possible signatories of the group and each additional parameter value, said computer device comprising:

means for verifying the electronic signature of the message, by extracting from the electronic signature of the message the respective public keys of the r possible signatories of the group, the values of the variability parameters respectively associated with the r possible signatories of the group and each additional parameter value, by obtaining r enciphered values by enciphering the values of the variability parameters associated with the r possible signatories of the group by means of their respective public keys, and by making sure that the message, the r enciphered values and each additional value together satisfy the ring equation;

means for recovering the anonymity withdrawal data stored by the anonymity withdrawal entity in relation with the identification of the anonymous signatory;

means for recalculating the identity trace of the anonymous signatory as a function of the anonymity withdrawal data recovered; and means for verifying that the recalculated identity trace corresponds to the identity trace included in the r values of variability parameters forming part of the electronic signature of the message.

28. A computer program product to be installed in a computer device for withdrawing anonymity of at least one anonymous signatory of an electronically signed message, wherein the anonymous signatory belongs to a group of r possible signatories each having an associated public key and an associated private key in an asymmetric cryptography scheme, r being an integer greater than 1, wherein the electronic signature of said message is generated in a process comprising the following steps executed in an electronic signature device of the anonymous signatory:

obtaining at least r values of variability parameters including the values of r-1 variability parameters respectively associated with the other possible signatories of the group and at least one additional parameter value, wherein at least one of the r variability parameter values is an identity trace of the anonymous signatory, determined as a function of anonymity withdrawal data stored and kept secret by at least one anonymity withdrawal entity in relation with an identification of the anonymous signatory, the obtaining of the at least r values of variability parameters including generating the identity trace of the anonymous signatory as a function of an intermediate value received from the anonymity withdrawal entity, the intermediate value being obtained by cryptographic hashing of a random value stored and kept secret with an identification of the anonymous signatory as anonymity withdrawal data at the anonymity withdrawal entity;

enciphering the values of the r-1 variability parameters associated with the other possible signatories of the group, by means of the respective public keys of said other possible signatories, thereby producing r-1 enciphered values respectively associated with the other possible signatories of the group;

determining a complementary value which satisfies a ring equation whose variables are the message to be signed, each of the r-1 enciphered values associated with the other possible signatories of the group, each additional parameter value and said complementary value;

deciphering the complementary value determined, by means of the private key of the anonymous signatory, thereby producing the value of a variability parameter associated with the anonymous signatory; and delivering an electronic signature of the message comprising the respective public keys of the r possible signatories of the group, the values of the variability parameters respectively associated with the r possible signatories of the group and each additional parameter value, the computer program product comprising instructions for implementing the following steps when executed by processing means of said computer device:

verifying the electronic signature of the message, by extracting from the electronic signature of the message the respective public keys of the r possible signatories of the group, the values of the variability parameters respectively associated with the r possible signatories of the group and each additional parameter value, by obtaining r enciphered values by enciphering the values of the variability parameters associated with the r possible signatories of the group by means of their respective public keys, and by making sure that the message, the r enciphered values and each additional value together satisfy the ring equation;

recovering the anonymity withdrawal data stored by the anonymity withdrawal entity in relation with the identification of the anonymous signatory;

recalculating the identity trace of the anonymous signatory as a function of the anonymity withdrawal data recovered; and verifying that the recalculated identity trace corresponds to the identity trace included in the r values of variability parameters forming part of the electronic signature of the message.

* * * * *